United States Patent
Manning

(10) Patent No.: US 7,178,226 B2
(45) Date of Patent: Feb. 20, 2007

(54) WIRE INSTALLATION TOOL

(76) Inventor: James C. Manning, 5594 Beebe Dr., Rochelle, IL (US) 61068

(*) Notice: Subject to any disclaimer, the term of this patent is extended or adjusted under 35 U.S.C. 154(b) by 389 days.

(21) Appl. No.: 09/996,295

(22) Filed: Nov. 28, 2001

(65) Prior Publication Data

US 2002/0062550 A1 May 30, 2002

Related U.S. Application Data

(60) Provisional application No. 60/253,584, filed on Nov. 28, 2000.

(51) Int. Cl.
*B23P 19/00* (2006.01)

(52) U.S. Cl. .............. 29/759; 29/828; 29/832; 29/739; 29/740; 405/154.1; 405/158; 405/184

(58) Field of Classification Search .................. 29/857, 29/745, 759, 281.1, 281.6, 281.4; 174/50, 174/48, 49, 53, 54, 55, 56, 17 R, 57, 58, 174/59, 60, 61, 65 R, 65 G, 68.1, 73.1, 74, 174/101, 135; 220/3.2, 3.3, 3.4, 3.5, 3.6–3.9, 220/4.02

See application file for complete search history.

(56) References Cited

U.S. PATENT DOCUMENTS

| | | | | |
|---|---|---|---|---|
| 2,746,715 A | * | 5/1956 | Sherrod | 254/134.3 R |
| 3,372,441 A | * | 3/1968 | Fisher | 16/2.1 |
| 4,050,205 A | * | 9/1977 | Ligda | 52/357 |
| 4,358,089 A | * | 11/1982 | Metcalf | 254/415 |
| 4,541,615 A | * | 9/1985 | King, Jr. | 254/134.3 FT |
| 4,738,634 A | | 4/1988 | Taylor et al. | |
| 5,029,817 A | * | 7/1991 | Tamm | 254/134.3 R |
| 5,096,163 A | | 3/1992 | Swearingen | |
| 5,170,014 A | | 12/1992 | Borsh | |
| 5,271,605 A | * | 12/1993 | Damron | 254/134.3 FT |
| 5,297,690 A | | 3/1994 | Bardaville | |
| 5,488,198 A | * | 1/1996 | Kramer | 174/48 |
| 5,627,342 A | * | 5/1997 | Kramer | 174/65 G |
| 6,349,460 B1 | * | 2/2002 | Eslambolchi et al. | 29/407.04 |

* cited by examiner

*Primary Examiner*—Rick Kiltae Chang
(74) *Attorney, Agent, or Firm*—Reinhart Boerner Van Deuren P.C.

(57) ABSTRACT

An electrician's tool generally comprises a plate having a hole formed therein, the hole defined by an inner edge. The edge includes means for safely sliding wire through the hole and past the edge. In one embodiment the means for safely sliding the wire includes at least one roller rotatably positioned adjacent the inner edge for safely sliding the wire past the edge. In another embodiment of the invention, the means for safely sliding comprises a round bar or curled inner edge providing a curved surface for safely sliding the wire across the edge.

12 Claims, 3 Drawing Sheets

28

28

WIRE INSTALLATION TOOL

CROSS-REFERENCE TO RELATED PATENT APPLICATIONS

This patent application claims the benefit of U.S. provisional patent application No. 60/253,584, filed Nov. 28, 2000.

FIELD OF THE INVENTION

The present invention relates generally to electrical wiring and more particularly relates to a tool for installing building wire in conduit.

BACKGROUND OF THE INVENTION

Modern buildings are equipped with appropriate electrical wiring to provide, among other things, electricity to the building. It is conventional to first outfit the building with appropriate conduits, connections, outlets and other various routing members for such wiring. Complex routes are often designed and implemented to properly provide all areas of the building with the appropriate wiring, as well as to do so in a safe manner. The electrical wiring of modern buildings is usually regulated by federal, state and local ordinances, including the National Electrical Code.

Typically, the branch circuit wiring for a building is planned and the routing of wires is laid out according to the plan utilizing common routing members or components such as conduits, junction boxes and outlet boxes. Once the proper routing is in place, wires are typically pulled through the appropriate conduits which are linked by junction boxes and outlet boxes, to accomplish the wiring plan. A long relatively rigid metal tape, commonly known as a fish tape, is fed through the conduits to guide the wire therethrough. First, the fish tape is pushed through the appropriate conduit or conduits, typically into a junction or outlet box. Next, building wire is connected to the end of the fish tape, typically by attaching the wire around a loop formed in the fish tape, and then taping or the like. Third, the fish tape is reeled in, pulling the wire through the selected path. When wire is being pulled through junction boxes, outlet boxes and conduits, it is a standard wiring method to have one person reeling in the fish tape and a second person feeding the wire into the junction box and conduit. The second person feeding the wire is needed to ensure that the wire, and more specifically the insulation layer protecting the wire, is not damaged on the sharp edges and corners often found in such routing members. Unfortunately, this requires two men for a rather straight-forward job.

BRIEF SUMMARY OF THE INVENTION

In light of the above, a general object of the present invention is to permit a single person to install wire in a building.

In that regard, it is also an object of the present invention to eliminate the need for a second person feeding wire when wiring a building.

It is another object of the present invention to provide an electrician's tool which accomplishes the above stated objects, the tool being universally adaptable to virtually all standard electrical routing members and components.

In accordance with these objects, the present invention provides an electrician's tool comprising a plate having a hole formed therein, the hole defined by an inner edge. The edge includes means for safely passing wire through the aperture without damage to the wire. Preferably, the wire passing means safely slides the wire past the edge.

In one embodiment of the invention, the wire passing means includes at least one roller rotatably positioned adjacent the inner edge for safely sliding the wire past the edge. Preferably, the at least one roller extends along the inner edge to provide a surface for sliding the wire across safely.

In another embodiment of the invention, the wire passing means comprises round stock attached to the inner edge to provide a curved surface for sliding the wire past the edge. In yet another related embodiment, the inner edge itself includes a curled lip having a curved surface for safely sliding the wire past the edge. The curved surfaces provided by the round stock or curled lip may be coated with a substance having a low co-efficient of friction, such as teflon.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
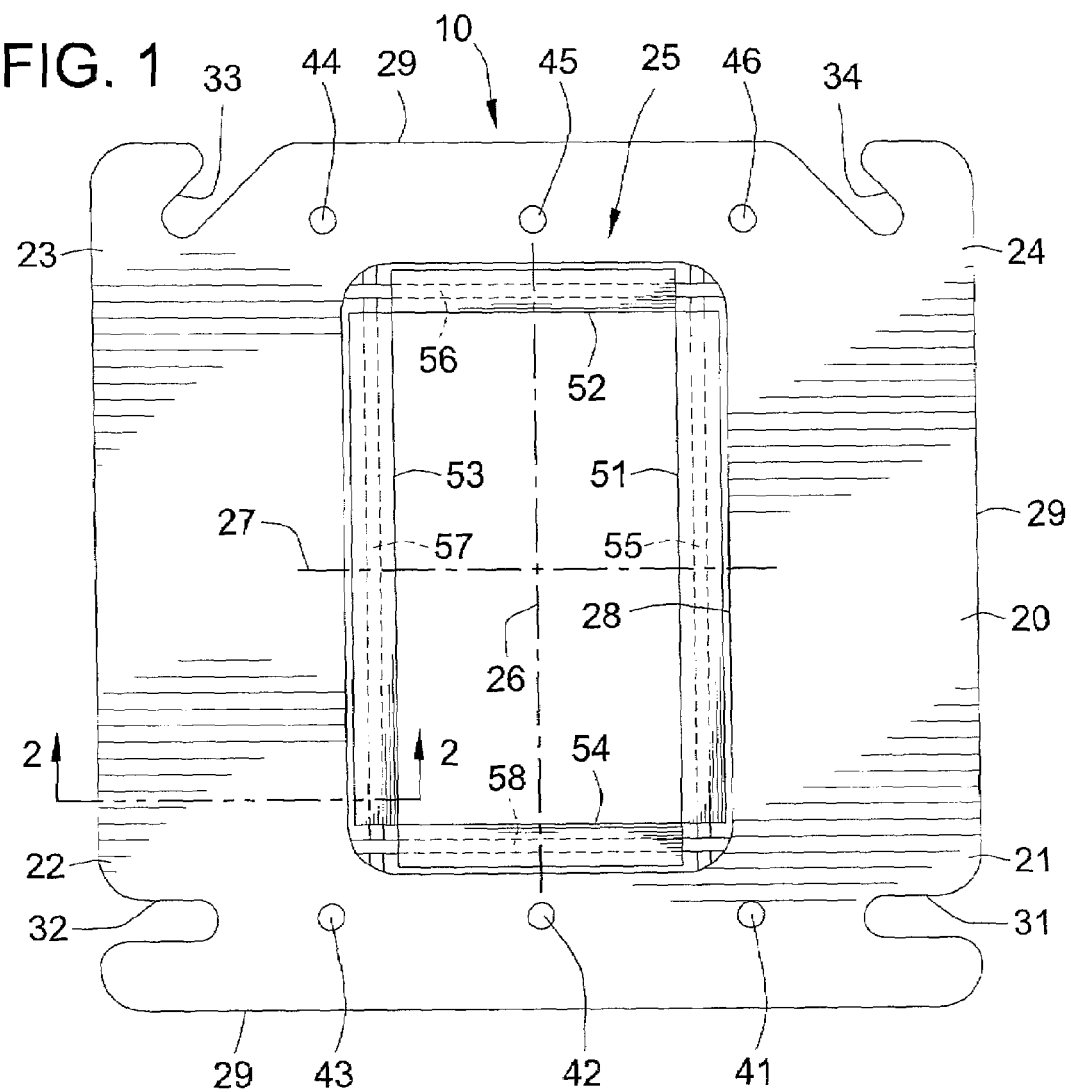
FIG. 1 is a top view of an embodiment of the electrician's tool constructed in accordance with the teachings of the present invention.

Referring now to the drawings, FIG. 1 shows a top view of an embodiment of an electrician's tool for pulling wire constructed in accordance with the teachings of the present invention. The electrician's tool 10 generally comprises a rectangular, preferably square, plate 20. The plate may be comprised of metal, or even a suitably rigid plastic. The plate 20 generally includes four corners 21, 22, 23, 24. Each corner includes a hole, which in the preferred embodiment is a slot 31, 32, 33, 34. The slots are sized to receive a threaded fastener therethrough for mounting the plate 20 to a standard electrical junction box. Junction boxes are standard equipment used in the electrical trade, and are standardly sized at either 4 inches square or $4^{11}/_{16}$ inches square. At the corner of these boxes, holes are found for receiving threaded fasteners to mount devices such as cover plates, light fixture outlets, electrical outlets, light switches, etcetera. The slots 31, 32 at two adjacent corners 21, 22 extend inwardly into the plate 20 in a direction generally parallel with the adjacent outer edge 29 of the plate 20. The remaining corners 23, 24 include two slots 33, 34 which also extend inwardly into the plate 20, but angled relative to the slots 31, 32, and hence relative to the outer edges 29 of the plate 20.

Each of the slots are preferably sized at about 3/16 inch wide for receiving 8–32 screws for mounting the plate 20 to the holes in the junction box which are typically 3/16 inch in size. The distance between all the slots 31, 32, 33, 34 are selected to correspond with mounting apertures on a junction box (not shown). While the present invention has been described with regard to a junction box and the standard U.S. sizes of such boxes, it will readily appreciated by those having skill in the art that the size and shape of plate 20 and its apertures or slots may be sized and positioned to correspond with any common routing member in the electrical trade, including standard sizes used around the world. Such routing components include junction boxes, switchboxes, receptacle boxes, light fixtures and other related fixtures, to name a few.

Similarly, differently sized mounting means for the plate 20 may be required since junction boxes may already include some routing members or other electrical equipment mounted thereto. For example, a single gang or two gang device ring may be attached to a junction box. Such devices include a raised surface which defines an inner hole that can be round, rectangular or some other common shape. When such is the case, alternate means for mounting the electrician's tool 10 to the junction box are needed. Accordingly, the present invention provides a series of small holes 41, 42, 43, 44, 45, 46, (the holes are typically 1/8 of an inch in diameter for use with 6–32 machine screws) which are sized and spaced to correspond with mounting apertures on such routing components commonly mounted to the junction box.

Notably, the plate 20 includes an aperture 25 formed therein to facilitate the passing of fish tape and wire into the conduit or other routing mechanisms utilized. The plate 20 includes an inner edge 28 defining the internal aperture 25. In the preferred embodiment, the aperture 25 is generally rectangularly shaped, and measures 1 13/16 inches by 2 7/8 inches. The rectangular aperture 25 includes a longitudinal axis 26 and a lateral axis 27. Such a size has been selected to correspond with the smallest aperture of routing devices known to attach to a junction box. It will be readily understood that other sizes and shapes are clearly within the spirit and scope of the present invention.

Means are provided adjacent the edge 28 for safely guiding wire through the hole 25 across the edge 28. According to the invention, once a fish tape has been fed through a conduit and into a junction box having the tool 10 installed, wiring may be attached to the end of the fish tape, and the fish tape pulled back through the conduit without the need for a second person feeding wire into the junction box. It is a known problem that due to the numerous sharp edges, corners, points and the like which are found in common junction boxes and other routing components, it is necessary for a person to feed the wire into the conduit to ensure the safety of the insulation which protects the wire, as well as the wire element itself. As used herein, the term "wire" refers to all types of wire generally, and includes the conducting wire element and the insulating sheath protecting the same.

Figure 2:
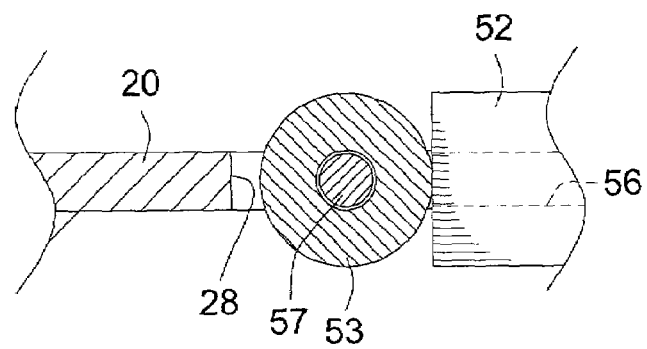
FIG. 2 is a cross-sectional view, partially cut-away, of the electrician's tool depicted in FIG. 1.

In the embodiment of the present invention depicted in FIGS. 1 and 2, at least one roller is positioned adjacent the inner edge 28 for safely sliding the wire across inner edge 28 and into the aperture 25. In the embodiment illustrated, four rollers 51, 52, 53, 54 are positioned adjacent respective edges of the rectangular aperture 25. The rollers 51, 52, 53, 54 are rotatably supported about axles 55, 56, 57, 58 which are suitably attached to the mounting plate 20. The rollers 51, 52, 53, 54 are positioned proximate one another to define a substantially continuous surface over which wire may be slid. As the rollers have a curved surface and are rotatable, the rollers assist feeding the wire into the junction box and conduit attached thereto. The plate 20 also includes corners 21, 22, 23, 24 that are rounded or curved to further facilitate and protect the insulation by eliminating sharp points and edges.

Figure 3:
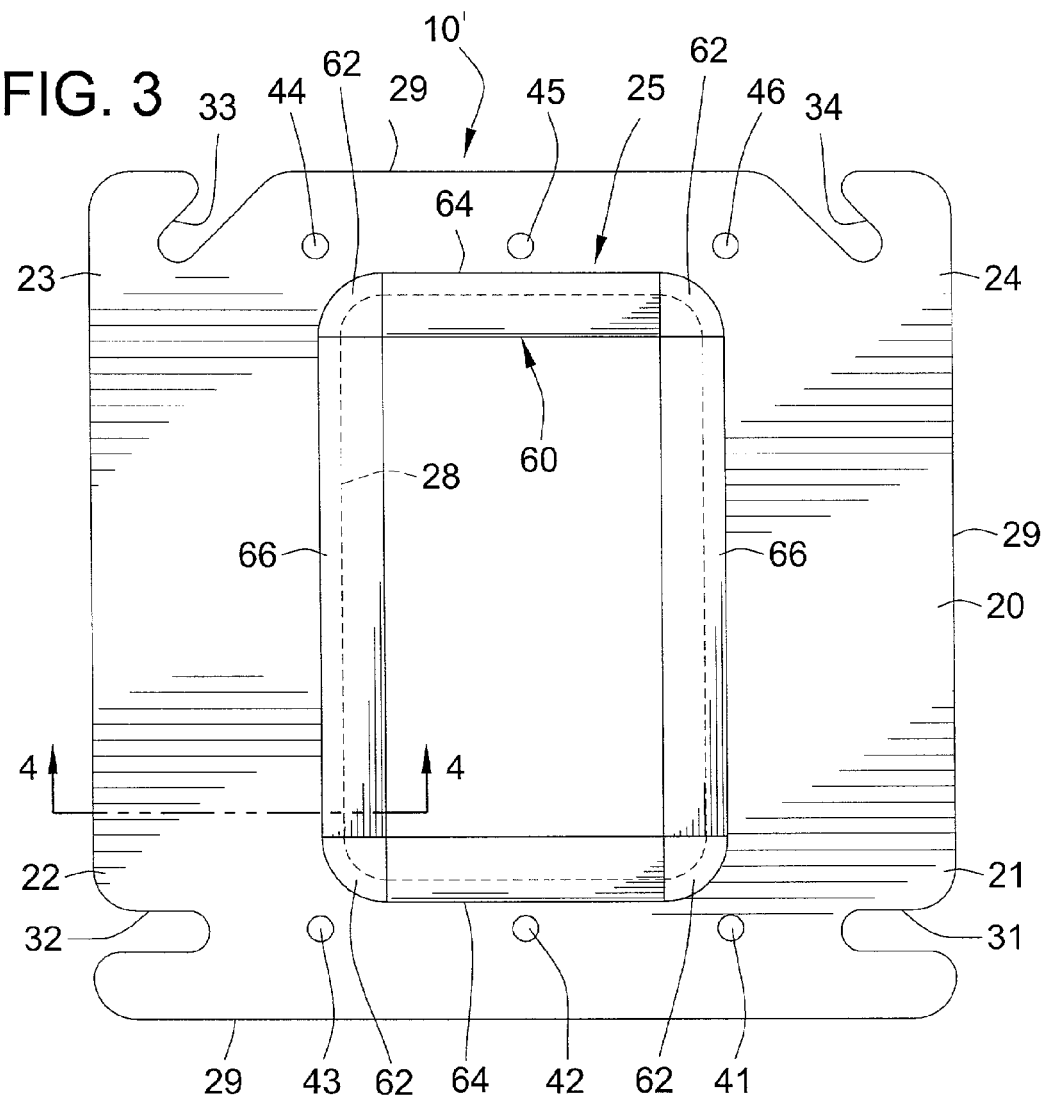
FIG. 3 is a top view of another embodiment of the electrician's tool constructed in accordance with the teachings of the present invention.
Figure 4:
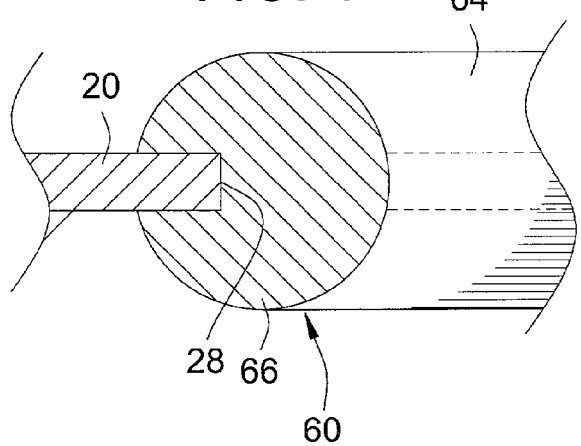
FIG. 4 is a cross-sectional view, partially cut-away, of the electrician's tool depicted in FIG. 3.
Figure 5A:
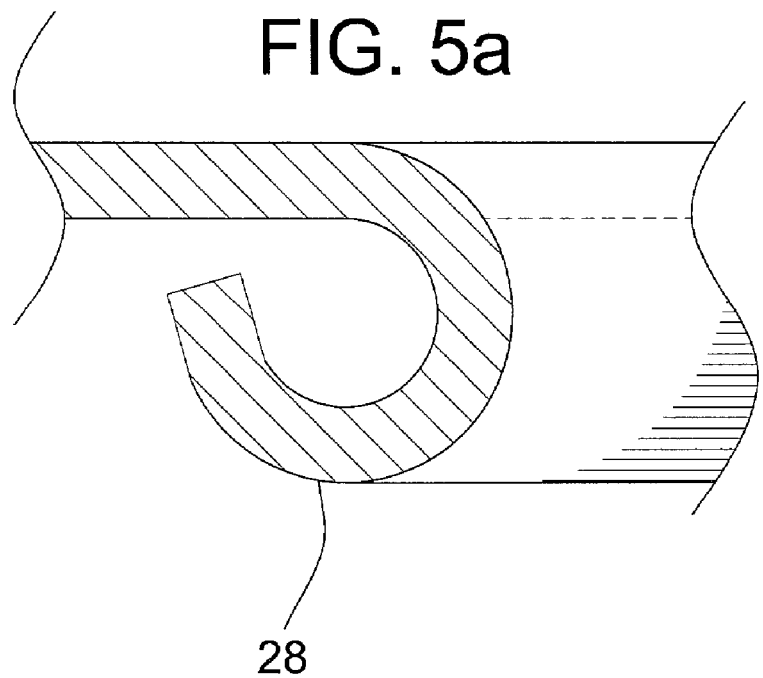
FIG. 5a is a cross-sectional view, partially cut away, of another embodiment of the electrician's tool.
Figure 5B:
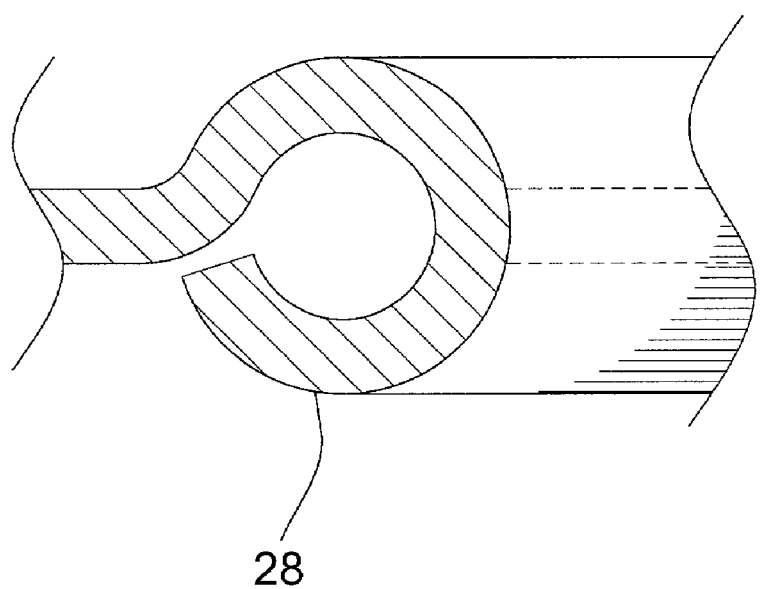
FIG. 5b is a cross-sectional view, partially cut away, of another embodiment of the electrician's tool.

In another embodiment of the invention shown in FIGS. 3 and 4, the tool 10' includes a plate 20 that is similarly shaped, although different means for safely sliding the wire into the central aperture 25 are provided. The means preferably comprise round or circular bar stock 60, attached to the inner edge 28 of the plate 20. The bar stock 60 provides a curved outer surface for safely sliding the wire through the hole 25 and into the junction box. The round bar 60 preferably includes a small slot 61 formed therein to receive the edge 28, for suitable attachment to the plate 20. The round bar 60 covering the inner edge 28 maybe segmented into several portions, including four bent corner portions 62, two longitudinal portions 64, and two lateral portions 66. The portions 62, 64, 66 permit easy assembly of the electrician's routing tool 10'. It will be recognized that a similar embodiment may be constructed by simply rolling the inner edge 28 of the plate 20 to form a curled lip having a curved outer surface for safely sliding wire through the central aperture 25, as shown in FIGS. 5a and 5b.

It will be noted that in the embodiments depicted, either the rollers 51, 52, 53, 54, the round bar stock 60, or the curled lip provide a curved surface that assists feeding wire from either side (i.e. top or bottom) of the plate 20. Therefore, it is unnecessary to select which side of the plate 20 is facing the junction box and which side faces outwardly therefrom, and the tool 10 may be quickly and easily installed to a junction box or other common routing member. In all embodiments, the curved surface may be coated with a substance having a low co-efficient of friction, such as Teflon, to increase the safety and speed of passing wire into the routing members. Other coatings, such as plastics, would also provide added safety and enhanced function.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electrician's tool for wiring a building using common routing components, the tool comprising:
   a plate structured for attachment to routing components;
   the plate having an aperture formed therein, the aperture defining an inner edge of the aperture; and two or more elongated rollers rotatably mounted to the plate and to extend at least partially into the aperture along the inner edge for precluding contact of a wire passing through the aperture with any portion of the inner edge of the aperture wherein the at least one roller has a diameter greater than a thickness of the plate.

2. The tool of claim 1, wherein the aperture is rectangular shaped defined by the inner edge having four sides, and wherein at least four rollers are rotatably positioned adjacent the inner edge, with at least one roller for each side of the inner edge, for precluding contact of the wire with any of the four sides of the inner edge of the aperture.

3. The tool of claim 2, wherein the rollers include ends, the ends of the rollers being positioned proximate each other to form a substantially continuous surface for safely sliding wire across the rollers and through the aperture.

4. The tool of claim 1, wherein the at least one roller is positioned to extend both above and below a plane defined by the plate, such that wire may be passed through the aperture from either direction.

5. The tool of claim 1, wherein at least two of the two or more rollers are oriented substantially perpendicular to one another.

6. The tool of claim 1, wherein the aperture defines orthogonally intersecting longitudinal and lateral axes thereof, and the rollers are positioned to simultaneously preclude contact between any portion of the inner edge and one or more wires passing through the aperture in either direction along either of the longitudinal and lateral axes.

7. The tool of claim 6, wherein the rollers are rotatable about roller axes, at least one of which is oriented parallel to either the longitudinal or the lateral axis of the aperture.

8. The tool of claim 7, wherein the roller axis of each of the rollers is oriented parallel to either the longitudinal or the lateral axis of the aperture.

9. The tool of claim 1, wherein the aperture is rectangular.

10. The tool of claim 1, wherein the plate is generally square and includes mounting holes spaced to correspond to standard mounting holes in routing components.

11. The tool of claim 10, wherein the mounting holes include slots positioned adjacent the four corners.

12. The tool of claim 11, wherein at least one of the slots is angled relative to an outer edge of the plate.

* * * * *